(12) United States Patent
Chen

(10) Patent No.: US 6,918,700 B2
(45) Date of Patent: Jul. 19, 2005

(54) BALL BEARING RAIL ASSEMBLY

(75) Inventor: I-Fee Chen, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 126 days.

(21) Appl. No.: 10/388,340

(22) Filed: Mar. 12, 2003

(65) Prior Publication Data

US 2004/0109619 A1 Jun. 10, 2004

(30) Foreign Application Priority Data

Dec. 6, 2002 (TW) ..................... 91219758 U

(51) Int. Cl.$^7$ ..................... A47B 88/00; F16C 19/00
(52) U.S. Cl. ..................... 384/49; 384/18; 384/51; 384/55; 384/56; 312/334.11
(58) Field of Search ..................... 384/18, 49, 51, 384/55, 56, 50; 312/334.11, 334.13, 334.17, 334.35

(56) References Cited

U.S. PATENT DOCUMENTS

| | | | | |
|---|---|---|---|---|
| 962,502 A | * | 6/1910 | Elmborg | 384/18 |
| 1,164,571 A | * | 12/1915 | Bodine | 384/18 |
| 3,145,065 A | * | 8/1964 | Cator | 384/49 |
| 3,488,097 A | * | 1/1970 | Fall | 384/18 |
| 3,904,254 A | * | 9/1975 | Hagen et al. | 384/18 |
| 4,470,643 A | * | 9/1984 | Schaefer et al. | 384/49 |
| 4,511,187 A | * | 4/1985 | Rees | 384/18 |
| 4,991,981 A | * | 2/1991 | Baxter | 384/18 |
| 5,219,057 A | * | 6/1993 | Sundseth | 193/35 MD |
| 5,248,203 A | * | 9/1993 | Agari | 384/49 |
| 6,200,225 B1 | * | 3/2001 | Hobaugh, II | 464/167 |
| 6,402,382 B1 | * | 6/2002 | Schnapp et al. | 384/49 |
| 6,705,948 B2 | * | 3/2004 | Cermak et al. | 464/167 |

* cited by examiner

Primary Examiner—David A. Bucci
Assistant Examiner—Colby Hansen
(74) Attorney, Agent, or Firm—Wei Te Chung

(57) ABSTRACT

A ball bearing rail assembly includes a first slide member (100), a second slide member (200), and a plurality of ball bearings (300) movably retained in the first slide member. The first slide member includes a plurality of spoon-like tabs (12), each tab forming a recessed portion (120) at a free end thereof. A plurality of slots (14) is defined in the first slide member, each slot having a generally oval end portion (140). The recessed portions of the tabs fittingly and resiliently press the ball bearings against the first slide member at the oval portions of the slots respectively. Each ball bearing is partially exposed out of the first slide member at a corresponding oval portion of the slot. The second slide member is slidably engaged with the exposed portions of the ball bearings. Thus the first slide member can be reliably moved relative to the second slide member.

4 Claims, 1 Drawing Sheet

BALL BEARING RAIL ASSEMBLY

BACKGROUND OF THE INVENTION

1. Field of the Invention

The present invention relates to ball bearing rails, and particularly to a ball bearing rail assembly having simple retention devices for ball bearings.

2. Related Art

Rails have been widely used in many fields. For example, servers are slidably mounted to server racks using rail assemblies. Also, drawers are slidably attached to cabinets using rail assemblies.

Among a variety of widely used rail assemblies, ball bearing rails have been found to be durable and reliable. TW patent publication No. 499905 discloses a ball bearing drawer rail assembly. The drawer rail assembly comprises a first slide member attached to a cabinet, a second slide member attached to a drawer, and two ball retention modules disposed between the first and second slide members. Each ball retention module comprises a flat retention frame, and a plurality of ball bearings movably held in the retention frame. The first and second slide members both slidably engage with the ball bearings, such that the drawer can be slid into and out of the cabinet.

In the above-described drawer rail assembly, the ball retention module is separate from the slide members. A separate mold for the ball retention module is required. Therefore, associated design and manufacturing costs are inflated. In addition, the separate ball retention module makes the structure of the drawer rail assembly unduly complicated.

Thus an improved ball bearing rail assembly which overcomes the above-mentioned problems is desired.

SUMMARY OF THE INVENTION

Accordingly, an object of the present invention is to provide a ball bearing rail assembly having a simple structure.

Another object of the present invention is to provide an inexpensive ball bearing rail assembly.

To achieve the above-mentioned objects, a ball bearing rail assembly in accordance with a preferred embodiment of the present invention comprises a first slide member, a second slide member, and a plurality of ball bearings movably retained in the first slide member. The first slide member comprises a plurality of spoon-like tabs integrally extending therefrom. Each tab forms a recessed portion at a free end thereof. A plurality of slots is defined in the first slide member. Each slot comprises a generally oval end portion, matching the recessed portion of a corresponding tab. The recessed portions fittingly and resiliently press the ball bearings against the first slide member at the oval portions of the slots respectively. Each ball bearing is partially exposed out of the first slide member at a corresponding oval portion of the slot. The second slide member is slidably engaged with the exposed portions of the balls. Thus the first slide member can be reliably moved relative to the second slide member.

Other objects, advantages and novel features of the present invention will be drawn from the following detailed description of preferred embodiments of the present invention with attached drawings, in which:

DESCRIPTION OF THE PREFERRED EMBODIMENT

Figure 1:
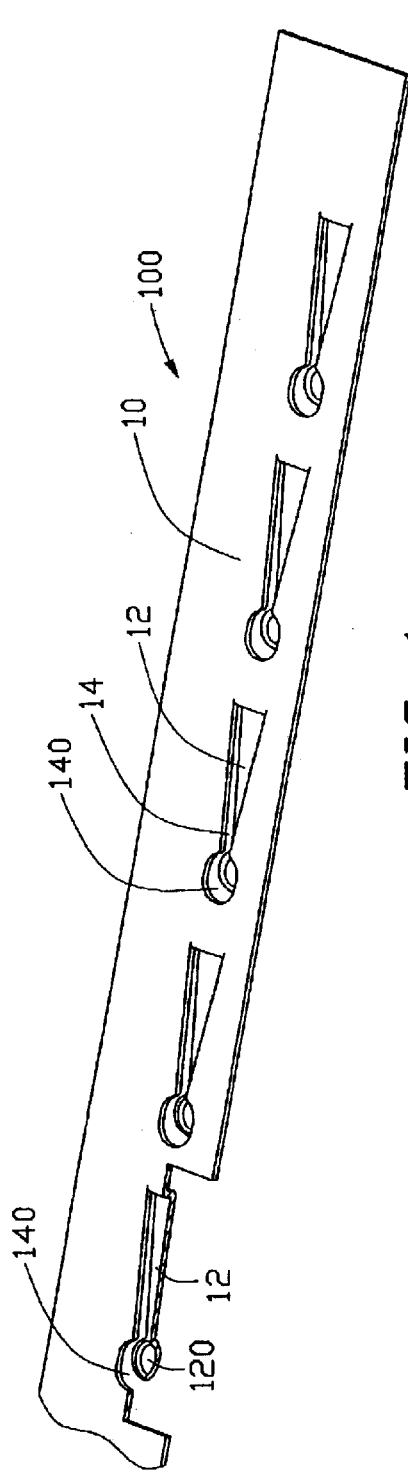
FIG. 1 is an isometric view of a first slide member of a ball bearing rail assembly in accordance with a preferred embodiment of the present invention, with a portion thereof cut away for clearer illustration.
Figure 2:
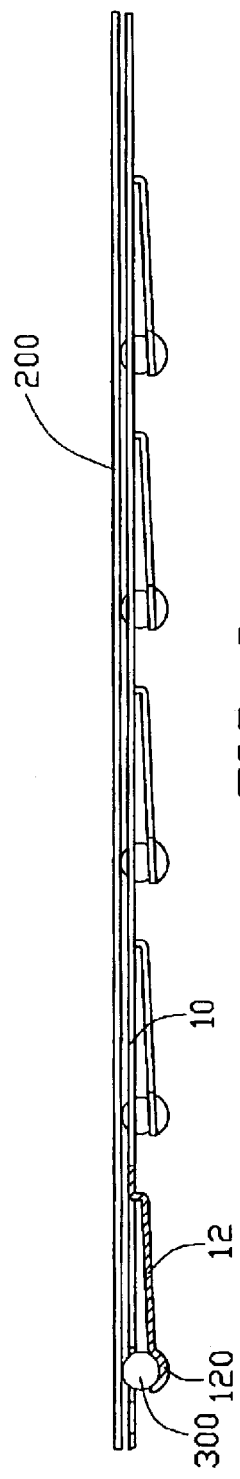
FIG. 2 is a side elevation view of the ball bearing rail assembly in accordance with the preferred embodiment of the present invention.

Referring to FIGS. 1 and 2, a ball bearing rail assembly in accordance with a preferred embodiment of the present invention comprises a first slide member 100, a second slide member 200, and a plurality of ball bearings 300 retained in the first slide member 100 such that the first slide member 100 is slidably engaged with the second slide member 200.

The first slide member 100 comprises an elongate engaging plate 10. A plurality of evenly spaced spoon-like tabs 12 is stamp downwardly at a slight angle from the engaging plate 10. A recessed portion 10 is formed at a free end of each tab 12. A plurality of evenly spaced slots 14 is thus defined in the engaging plate 10, corresponding to the tabs 12. Each slot 14 has a generally round end portion 140, matching the recessed portion 120 of the corresponding tab 12. In the preferred embodiment, the end portion, 140 is generally oval. A shortest width of each oval portion 14 is less than a diameter of each ball bearing 300. The recessed portion 120 of each tab 12 and the oval portion 140 of the corresponding slot 14 are spaced apart distance such that one ball bearing 300 can be received thereat.

In assembly of the ball bearings 300 to the first slide member 100, the tabs 12 are resiliently bent away from the engaging plate 10 respectively, to create spaces large enough for receipt of the ball bearings 300 thereat. The ball bearings 300 are respectively placed in said spaces, and the tabs 12 resiliently return to substantially their original positions. Thus the recessed portions 120 fittingly and pressingly abut undersides of the ball bearings 300, pressing the ball bearings 300 against the engaging plate 10 at respective oval portions 140. Upper portions of the ball bearings 300 are exposed above the engaging plate 10 at the respective oval portions 140.

In further assembly and use, a pair of combined first slide members 100 and ball bearings 300 is attached to opposite walls respectively of a fixed body such as a cabinet (not shown). A pair of second slide members 20 is attached to opposite sides respectively of a movable body such as a cabinet drawer (not shown). The second slide members 20 are slidably engaged with the exposed portions of the ball bearings 30. Thus the drawer can be easily and reliably slid out of or into the cabinet.

In the above description, the first slide members 100 are attached to a fixed body, and the second slide members 20 are attached to a movable body. Alternatively, the first slide members 100 may be attached to the movable body, and the second slide members 200 may be attached to the fixed body.

In the above description, the first and second slide members 100, 200 are separate, freestanding components prior to their respective attachment to the fixed and movable bodies. However, the first and second slide members 100, 200 may alternatively comprise parts of the two bodies respectively. For example, opposite portions of a cabinet may integrally form structures similar to the tabs 12. Said portions of the cabinet can function as the equivalents of the first slide members 100, with said structures receive the ball bearings 300. Opposite sides of a drawer may integrally form structures similar to the second slide members 200. Said sides of the drawer are slidably engaged with exposed portions of the ball bearings 300. Thus the drawer can be easily and reliably slid out of or into the cabinet.

In the present invention, the ball bearings 300 are retained by the resilient tabs 12 of the first slide member 100, without the need for a separate ball retention device. That is, the structure of the ball bearing rail assembly is simple. This saves material and reduces costs, particularly in mass production facilities.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A rail assembly comprising:

a first slide member comprising a plate and a plurality of separate cantilevered tabs having a fixed end and a free end respectively integrally extending from the plate, each of the tabs defining a retaining portion spaced from the plate, wherein the plate at the free ends of the tabs defines a plurality of separate slots facing the retaining portions of the tabs respectively;

a plurality of balls movably retained in the retaining portions of the tabs respectively and partially exposed through the slots of the plate of first slide member; and a second slide member slidably engaged with the portions of the balls exposed through the plate of the first slide member;

whereby the first and second slide members are movable relative to each other.

2. The rail assembly as described in claim 1, wherein each of the retaining portions are concave spoons facing the slots.

3. The rail assembly as described in claim 2, wherein each of the slots are oval, aligned with a corresponding retention portion, and the retention portion fittingly and resiliently presses a corresponding ball against the plate of the first slide member at the oval slot.

4. The rail assembly as described in claim 3, wherein a shortest width of the oval portion is less than a diameter of the ball, for preventing escape of the ball.

* * * * *